C. C. RUPRECHT.
RECTIFYING DEVICE.
APPLICATION FILED NOV. 25, 1914.

1,222,803.

Patented Apr. 17, 1917.

Inventor,
Charles C. Ruprecht
By Hull & Smith
Attys.

Witnesses:
R. L. Bruck.
H. Small.

UNITED STATES PATENT OFFICE.

CHARLES C. RUPRECHT, OF MIDWAY, FLORIDA.

RECTIFYING DEVICE.

1,222,803.     Specification of Letters Patent.     Patented Apr. 17, 1917.

Application filed November 25, 1914. Serial No. 874,064.

*To all whom it may concern:*

Be it known that I, CHARLES C. RU-PRECHT, a citizen of the United States, residing at Midway, in the county of Gadsden and State of Florida, have invented a certain new and useful Improvement in Rectifying Devices, of which the following is a full, clear, and exact description, reference being had to the accompanying drawings.

This invention relates to rectifying devices whereby an alternating current may be transformed into a direct current for many of the purposes for which direct current is necessary, such for example as for electrochemical purposes as required for electroplating or for charging storage batteries. The objects of the invention are the provision of an improved and simplified type of vibrating armature rectifier whereby the change of the current from alternating to direct may be effected economically and efficiently.

The type of rectifier with which this invention is concerned is that wherein a pivoted polarized armature is vibrated in synchronism with the alternations, suitable connections being provided whereby a reversal of the current is obtained. Polarization of the armature is effected either by means of a permanent magnet or an electromagnet (the latter being conveniently energized by the rectified current) while reversals of the armature polarity are effected by securing the same to one pole of a solenoid energized by the current to be rectified, the proper phase relation between the armature and the current being obtained either by means of a condenser or an inductance located in the solenoid circuit.

Figure 1:
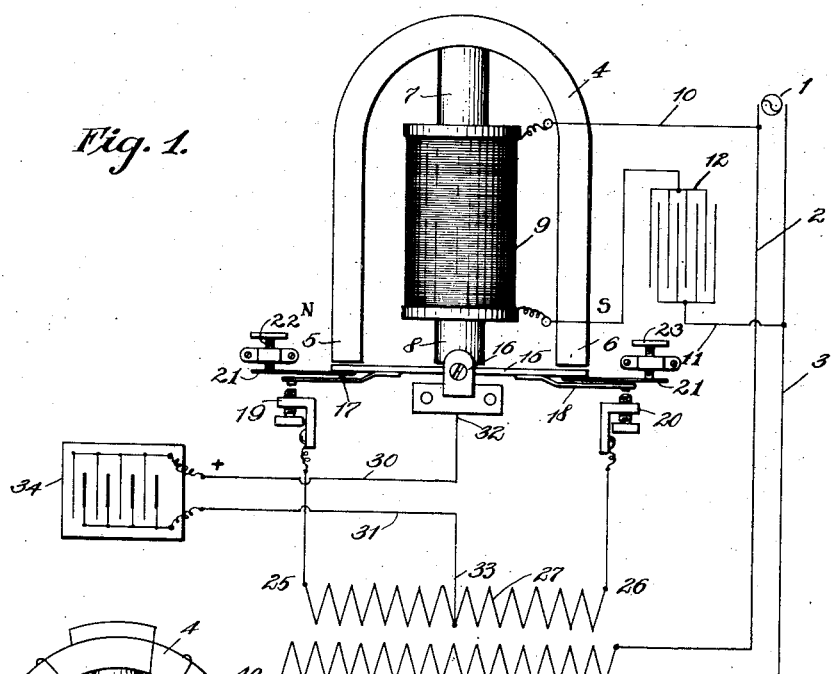
Figure 2:
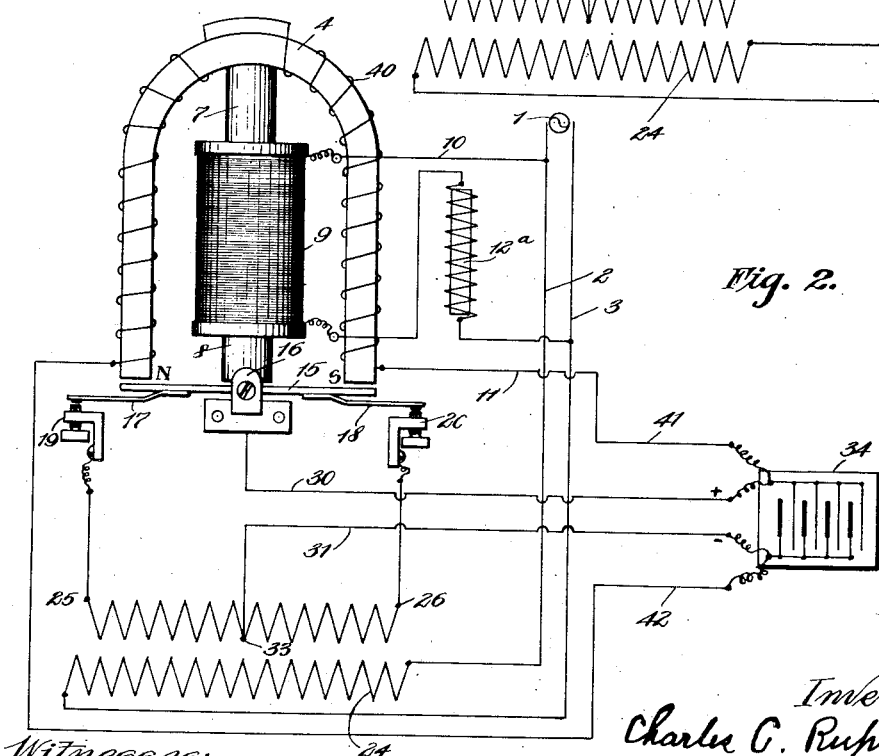

Generally speaking my invention may be defined as consisting of the combinations, constructions, and arrangement of circuits and apparatus, recited in the claims hereto annexed and illustrated in the drawings accompanying and forming a part of this specification, which show somewhat diagrammatic representations of two forms of my invention, the form in Figure 1 comprising a permanent magnet and a condenser in the solenoid circuit, and that in Fig. 2 showing an electromagnet for the constant polarity member, and an inductance in the solenoid circuit for maintaining the proper phase relation between the armature movement and the current in the supply main. It will be understood of course that there is no essential connection between the form of magnet and the form of regulator, either being usable with either at will.

Describing the parts by reference characters, having particular reference first to Fig. 1, 1 represents the alternator whose current is to be rectified, and from which extends the mains 2, 3. The rectifier itself in this embodiment comprises a U-shaped permanent magnet 4 having its poles 5 and 6 maintained in substantially the same plane, and 7 denotes the soft iron core of a solenoid arranged between the poles 5 and 6 of the permanent magnet 4, one end of this core being preferably magnetically joined with the central or neutral part of the permanent magnet and the other end forming a third pole 8 disposed substantially in the same plane with the poles 5 and 6 and intermediate therebetween. Wound upon this core is a solenoid 9 connected by leads 10 and 11 with the mains 2 and 3 (the particular direction of connection being immaterial since the current is balanced). 12 represents a condenser arranged in the connections 11, the purpose of the same being hereafter explained.

15 denotes a pivotal soft iron armature, which passes closely by the pole 8 of the solenoid core 7, so as to become, in effect, an extension of this core and to maintain at all times the same polarity as this core. The ends of the armature 15 are provided with contact members 17, 18, respectively, arranged to engage fixed contact members 19 and 20, respectively, and also with resilient members 21, 21 adapted to engage the adjustable stops 22, 23, the latter being for the purpose of preventing hammering and increasing the armature speed. The members 17, 19 and 18, 20 are so arranged that the circuits cannot be closed simultaneously but only alternately.

The mains 2, 3 are also connected to the primary 24 of a transformer, while the fixed contacts 19, 20 are connected to the ends 25, 26, respectively, of the secondary 27. One side of the rectified circuit is indicated at 30 and is connected to the movable contact members 17 and 18, the other side 31 being connected to the middle point 33 of the secondary 27. Any suitable current using devices may be connected between the mains 30, 31, a storage battery 34 being here illustrated.

The mode of operation is as follows: Assuming the direction of winding the primary and secondary of the transformer to be the same and considering the effect of an E. M. F. acting from left to right of the primary core 24, it is obvious that an opposing E. M. F. will be induced in the secondary 27 but in the opposite direction. In other words a current tends to be set up from 26 toward 33 and from 33 toward 25. Supposing at this instant that the contact 17, 19 is closed, an electrical circuit is produced through which current may flow by way of 25, 19, 17, 15, 32, 30, 34 and 31 to the point 33, thus making the main 30 positive and the main 31 negative as indicated. However the contacts 18 and 20 are necessarily spaced apart at this time, wherefore the E. M. F. between the points 26 and 33 will have no effect. In the next half cycle of the generator's operation, an E. M. F. will set up in the primary of the transformer from right to left, thereby inducing an opposing electro-motive force in the secondary from 25 to 33 and from 33 to 26. In case the armature 15 can be shifted at this time, it is clear that an electrical circuit will be produced by which this induced current may flow from 26 by way of 20, 18, 15, 30, 34 and 31 back to 33, thus completing a flow through the mains 30 and 31 in the same direction as before, the portion of the secondary between 25 and 33 being meanwhile open so that the E. M. F. generated therein will have no current producing effect.

The shift of connection necessary to effect this operation is caused by the armature 15 in the following manner. This armature has impressed upon it at all times an induced magnetization from the permanent magnet, and during the operation of the apparatus has a second magnetization superinduced upon it by the action of the solenoid, and under this second magnetization it acts merely as an extension of the solenoid core. Thus assuming the pole 5 of the permanent magnet to be N and the pole 6 S, the adjacent ends of the armature will become S and N respectively, but no material attraction or repulsion should take place in case the armature is properly balanced. Supposing, however, that at a given instant the pole 8 of the solenoid becomes N, the effect will be to tend to make the armature 15 entirely N, thus more or less completely neutralizing the S pole induced by the permanent magnet adjacent to the pole 5 and augmenting the N polarity adjacent the pole 6 of the magnet, thus increasing the attraction at the pole 6 and decreasing, or possibly overcoming the attraction at the pole 5. Upon the reversal of the polarity of the solenoid, a reversal of the polarity of the armature will occur with an attraction of the same in the opposite sense. The frame of the permanent magnet forms a pathway for the lines of force generated within the solenoid, these lines of force predominating in the south pole or the north pole of the permanent magnet depending upon the direction of magnetization of the solenoid, and causing an inclination of the armature in the direction of that pole in which the greater number of lines of force are carried.

Owing to the fact that both branches of the alternating circuit contain inductance, it is impossible that the E. M. F. and current should be in the same phase in either circuit, and it is unlikely that the phase angle between these quantities should be the same in the two circuits. In addition the mechanical inertia of the armature will tend to cause a lag at this point. Accordingly it is desirable to employ a suitable phase regulating means in one of the circuits, preferably by means of a capacity or inductance in the solenoid circuit, since in this way such a balance can be obtained between the armature movement and the current fluctuations in the transformer that a maximum of efficiency and a minimum of sparking can be obtained.

It will be obvious that the E. M. F. of the rectified current will depend upon the relation between the number of turns in the primary 24 and each half of the secondary 27, so that this apparatus will effect a voltage transformation as well as a rectification. However, there are other circuit dividing expedients which could be used instead of the transformer as will be understood by those skilled in the art.

The apparatus of Fig. 2 is exactly the same as in Fig. 1, the only difference being that an electromagnet 4$^a$ is substituted for the permanent magnet 4, its winding 40 being connected by leads 41 and 42 with the rectified mains 30 and 31, respectively. Also in this embodiment an inductance 12$^a$ is illustrated instead of the condenser 12 in the solenoid circuit, the result being to produce a lag of the current behind the electro-motive force instead of an advance ahead of the same, which condition may be compensated for by proper arrangement of connections and by proper balancing of the transformer 24. It is obvious that the connections to the transformer and to the solenoid are not necessarily from the same alternator, so long as a proper phase relation is always obtained between them. Also it will be understood that the present drawings do not pretend to illustrate features of construction but only general combination and arrangement, the detail construction of the several parts being well understood among those skilled in the art.

Having thus described my invention, what I claim is:—

1. In a rectifier, in combination, a fixed magnet of constant polarity, a soft iron armature movably supported adjacent to the poles thereof so as to be acted upon by them equally, a solenoid connected to the alternating mains, a core for said solenoid, one pole of said core being maintained in operative magnetic relation to said magnet and armature whereby the polarity of said armature will tend to follow the polarity of said core, contact members carried by said armature, a direct current system including said contact members, and means connecting said alternating current mains to the said contact members in such wise that the current pulsations therein will flow through said contact members and into said direct current mains in the same direction.

2. In a rectifier, in combination, a magnet having three fixed branches, two of said branches being of opposite but constant polarity and the third having a helix thereon connected to the alternating mains, a movable armature having its middle portion adjacent to said third branch and its ends opposite said first branches respectively, whereby the polarity of said armature will tend to follow the polarity of said third branch, contact members movable with said armature, direct current mains operatively connected to said contact members, and means connecting said alternating current mains to the said contact members in such wise that the current pulsations therein will flow through said contact members and into said direct current mains in the same direction.

3. A rectifier comprising, in combination, a magnet of constant polarity, a magnet of alternating polarity having one of its poles connected to said first magnet intermediate the poles thereof, a soft iron armature movably mounted adjacent to said second magnet and having its ends projecting adjacent to the poles of said first magnet, contact members movable with said armature, fixed contact members adapted for engagement by said movable contact members, an alternating current main, connections between said main and said alternating magnet, a direct current main connected to said alternating current main through said contact members, said last named connection being arranged so as to cause a reversal of current flow to be effected upon shift in the position of said contact members, and means for maintaining a predetermined phase relation between the current associated with said alternating magnet and the current associated with said contact members.

4. In a rectifier, in combination, a U-shaped magnet of constant polarity, a solenoid arranged between the arms of said first magnet, a core for said solenoid having one end connected to said first magnet intermediate the poles and having its other end disposed between said poles, a movable soft iron armature passing closely by the last named pole of said solenoid core and extending adjacent to the poles of said first magnet, contact members movable with said armature, fixed contact members coöperating therewith, a divided current circuit having its terminal portions connected with said fixed contacts and its intermediate portions connected with the rectified mains, the other side of the rectified main being connected to said movable contacts, and means for supplying alternating current of the same frequency and phase relation to said solenoid and to said divided current circuit.

In testimony whereof, I hereunto affix my signature in the presence of two witnesses.

C. C. RUPRECHT.

Witnesses:
 Jos. Edmunds,
 Bettie V. Herring.